No. 740,808.  
PATENTED OCT. 6, 1903.
C. CODA.
HYDRAULIC PLANT AND VESSEL OR RESERVOIR FOR CONTAINING WATER.
APPLICATION FILED APR. 27, 1903.
NO MODEL.
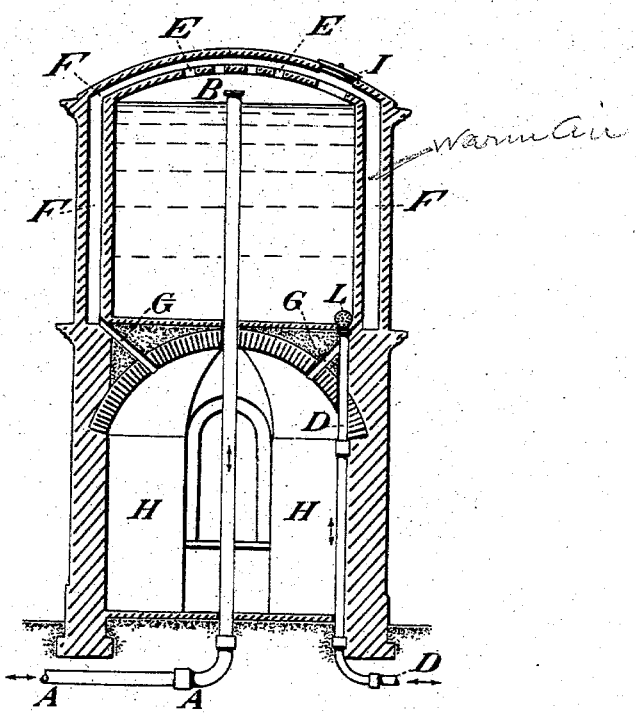
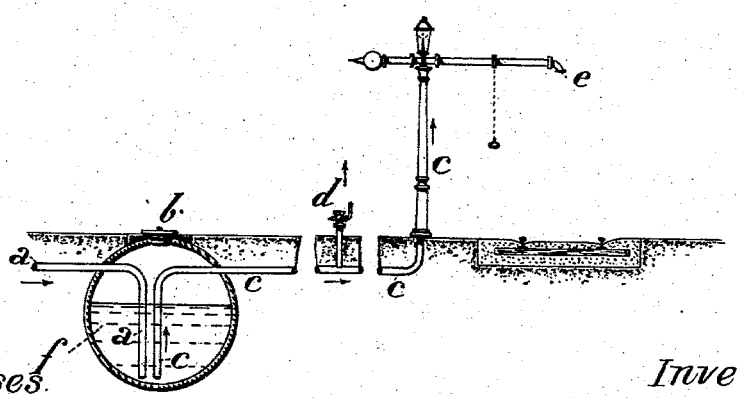
Witnesses.
Inventor
C. Coda.
by Wilkinson & Fisher
his Attorneys.

No. 740,808.

Patented October 6, 1903.

UNITED STATES PATENT OFFICE.

CARLO CODA, OF PISA, ITALY.

HYDRAULIC PLANT AND VESSEL OR RESERVOIR FOR CONTAINING WATER.

SPECIFICATION forming part of Letters Patent No. 740,808, dated October 6, 1903.

Application filed April 27, 1903. Serial No. 154,516. (No model.)

*To all whom it may concern:*

Be it known that I, CARLO CODA, a subject of the King of Italy, residing at 38 Strada Vittorio Emanuele, Pisa, in the Kingdom of Italy, have invented certain new and useful Improvements in and Connected with Hydraulic Plants and Vessels or Reservoirs for Containing Water, of which the following is a specification.

Among the objects of this invention is the prevention of freezing of the water-supply even in cold climates and the reduction of the chances of contamination thereof, while still maintaining at any desired point large volumes of water normally under pressure and suitable for various purposes—such as for the supply of locomotives, for use in industrial establishments and generally where powerful jets are from time to time required, as in the case of fire-hydrants, for fountains, or for other purposes—and is also a very simple way for distributing in houses the water of the cisterns collected from the roofs by means of air and water tight tubes and cisterns.

According to this invention the plant consists of a hermetically-closed reservoir of metal or masonry, which may be reinforced, if required, and which may be situated either above or below ground, as may be desired, and in the former case and for use in cold climates it may have a surrounding air-jacket, through which warmed air may be passed, the reservoir being also provided with inlet and discharge pipes and preferably also with a manhole.

In the accompanying drawings, Figure 1 represents in sectional elevation a hydraulic plant according to this invention with the reservoir above, and Fig. 2 an elevation when the reservoir is below ground.

In Fig. 1 the air required for the equilibrium and distribution of the water from C instead of being drawn direct from the atmosphere is taken from a place that is artificially heated or naturally temperate, as is the case in wells, tanks, or subterranean cavities, the temperature of which remains constant and in accord with the mean annual temperature of the locality.

A communication-pipe A, passing through the mass of water in reservoir C and projecting a few centimeters above the maximum level thereof, establishes communication between the body of air in the upper part B of said reservoir and that in the heated chamber H whether the latter be above or below the reservoir.

D is a supply-pipe through which the water is received from the main reservoir and through which it is discharged to the distributing nozzles or hydrants.

E E are openings for the passage of air from the upper part B of reservoir C into the air-space F, surrounding the reservoir C, a further opening or passage leading from this air-space into the chamber H, which may be heated, if desired. A manhole I is provided for inspecting the reservoir C, and a grating L may be fixed to the pipe D to prevent foreign substances from entering therein. Where possible, it is convenient on the score of economy in cost and space to construct the reservoirs entirely underground, as shown in Fig. 2, and this will in cold climates more effectually protect the water from freezing during the winter. In said figure, $a$ is the pipe through which water is supplied from the mains under pressure into a longitudinal reservoir $f$, in which the air is compressed by the incoming water. $c$ is the distributing-pipe, delivering the water under pressure to such points as $d$ $e$. For purposes of inspection a manhole $b$ may be provided in the reservoir $f$.

In hermetically-closed reservoirs supplied by water under pressure or by mechanical means the air is compressed to an extent corresponding with the height of the head of water or the capacity of the motor-pump supplying same. Such reservoirs are therefore in a position to deliver water to a considerable height, dependent upon the amount of pressure to which the contained air has been subjected, as is well known.

It should be noted that, particularly in the case of reservoirs supplied by water under pressure, one cannot with the actual methods of installation utilize the whole of the power or the necessary amount to produce powerful jets of water whether for supplying railway-engines in stations, for sluicing purposes, fire-hydrants, and other purposes in industrial establishments, whereas this object can be fully attained with the system of hermetically-closed reservoirs, which of course must be of sufficient strength to withstand the pressure to which the air and the water itself will be exposed.

In order to furnish powerful jets of water at the desired points, it is preferred to have the reservoirs situated near the distributing outlets or points of intended use, and a series of them may be in direct communication with each other and the main reservoirs, which latter also may (like the secondary reservoirs) be constructed below the ground-level.

What I claim is—

1. In a hydraulic plant, the combination of a reservoir, supply and delivery pipes for said reservoir, a casing forming an air-chamber surrounding said reservoir and communicating therewith, and an air-pipe passing nearly through said reservoir.

2. In a hydraulic plant, the combination of a reservoir, a casing surrounding said reservoir at a distance therefrom forming an air-chamber around said reservoir, said reservoir being provided with openings communicating with said air-chamber, supply and delivery pipes for said reservoir, an air-pipe passing through said reservoir nearly to the top thereof, and means for heating the air in said air-chamber, substantially as described.

3. In a hydraulic plant, the combination of a reservoir, a casing surrounding said reservoir at a distance therefrom forming an air-chamber around said reservoir, said reservoir being provided with openings communicating with said air-chamber, supply and delivery pipes for said reservoir, an air-pipe passing through said reservoir nearly to the top thereof, a heating-chamber underneath said reservoir, and passages through the walls of said heating-chamber communicating with said air-chamber, substantially as described.

In testimony whereof I have hereunto set my hand in the presence of two subscribing witnesses.

CARLO CODA.

Witnesses:
EMILIO MASI,
ANTONIO MAINARDI.